US011108973B2

(12) United States Patent
Ling et al.

(10) Patent No.: US 11,108,973 B2
(45) Date of Patent: Aug. 31, 2021

(54) VARYING A ZOOM LEVEL OF AN IMAGE RECORDED WITH A LENS HAVING A FIXED ZOOM LEVEL

(71) Applicant: Essential Products, Inc., Palo Alto, CA (US)

(72) Inventors: Yazhu Ling, San Jose, CA (US); Kumi Akiyoshi, San Francisco, CA (US); Ashish Sharma, Sunnyvale, CA (US); Tien Viet Nguyen, San Jose, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 185 days.

(21) Appl. No.: 16/564,985

(22) Filed: Sep. 9, 2019

(65) Prior Publication Data

US 2020/0112692 A1    Apr. 9, 2020

Related U.S. Application Data

(60) Provisional application No. 62/741,987, filed on Oct. 5, 2018.

(51) Int. Cl.
*H04N 5/262* (2006.01)
*H04N 5/265* (2006.01)
*H04N 5/225* (2006.01)
*H04N 5/235* (2006.01)

(52) U.S. Cl.
CPC ......... *H04N 5/2628* (2013.01); *H04N 5/2258* (2013.01); *H04N 5/2351* (2013.01); *H04N 5/265* (2013.01)

(58) Field of Classification Search
CPC ......... H04N 9/04559; H04N 5/232935; H04N 5/23296
See application file for complete search history.

(56) References Cited

U.S. PATENT DOCUMENTS

| | | | | |
|---|---|---|---|---|
| 2010/0110222 | A1* | 5/2010 | Smith | H04N 1/32603 348/222.1 |
| 2017/0366754 | A1* | 12/2017 | Feng | H04N 5/343 |
| 2018/0013955 | A1* | 1/2018 | Kim | H04N 5/23238 |
| 2021/0067749 | A1* | 3/2021 | Yadav | H04N 5/23245 |

* cited by examiner

*Primary Examiner* — Antoinette T Spinks
(74) *Attorney, Agent, or Firm* — Perkins Coie LLP; Michael A. Glenn

(57) ABSTRACT

Presented here is a system and method to record images having varying zoom levels using a lens having a substantially fixed zoom level. The resulting image can have varying zoom levels and can be of high quality. The light sensor recording the image can have a resolution higher than the desired resolution of the resulting image. The high resolution of the light sensor allows digital zooming, i.e., cropping of the image. The light sensor can operate in two modes, where each mode produces varying resolutions of the resulting image. Operating the light sensor in the mode producing a high resolution of the resulting image, however, does not produce images of satisfactory quality in low light conditions, and the light sensor may need to be switched between the first and the second mode depending on the zoom level and the lighting conditions.

20 Claims, 8 Drawing Sheets
(3 of 8 Drawing Sheet(s) Filed in Color)

|  | Bright Light (~>1000 lux) 600 | Mid Light (~1000 lux - 30 lux) 610 | Low Light (~<30 lux) 620 |
|---|---|---|---|
| No Zoom 630 | Mode 1 binned 605 | Mode 1 binned 615 | Mode 1 binned 625 |
| 1.4x Zoom 640 | Mode 2 crop and downscale 635 | Mode 2 crop and downscale 645 | Mode 1 crop and 1.4x upscale 670 |
| 2x Zoom 650 | Mode 2 crop 655 | Mode 2 crop 665 | Mode 1 crop and 2x upscale 680 |
| 2.5x Zoom 660 | Mode 2 crop and 1.25x upscale 675 | Mode 2 crop and 1.25x upscale 685 | Mode 1 crop and 2.5x upscale 690 |

*FIG. 6*

VARYING A ZOOM LEVEL OF AN IMAGE RECORDED WITH A LENS HAVING A FIXED ZOOM LEVEL

CROSS-REFERENCE TO RELATED APPLICATIONS

This application claims priority to the U.S. provisional patent application Ser. No. 62/741,987 filed Oct. 5, 2018 which is incorporated herein by this reference in its entirety.

TECHNICAL FIELD

The present application is related to cameras, and more specifically to methods and systems that enable a lens having a fixed zoom level to record images having varying zoom levels.

BACKGROUND

Cameras are ubiquitous in today's mobile devices. However, the mobile device cameras produce images of inferior quality as compared to standalone cameras because the mobile device cameras do not allow a user to change lenses and record an image using a lens best suited for the image. Further, the lenses of the mobile device cameras have a fixed zoom level and do not allow an optical zoom. For example, the user cannot use a single lens on a cell phone to zoom in on an object of interest. Further, the user cannot optically zoom the single lens of the mobile device camera to obtain a high-resolution image of the object of interest. Consequently, the mobile device cameras do not produce high-quality images when the zoom level varies.

SUMMARY

Presented here is a system and method to record images having varying zoom levels using a lens having a substantially fixed zoom level. The resulting image can have varying zoom levels and can be of high quality. The light sensor recording the image can have a resolution higher than the desired resolution of the resulting image, for example four or eight times higher than the desired resolution of the resulting image. The high resolution of the light sensor allows digital zooming, i.e., cropping of the image, without degradation of image quality.

The light sensor can operate in two modes, where each mode produces varying resolutions of the resulting image. In the first mode, the resulting image can have a smaller resolution than the light sensor, because measurements made by neighboring sub-sensors can be combined into a single pixel in the resulting image. In the second mode, the resulting image can have the same resolution as the light sensor, because each measurement made by a sub-sensor of the light sensor can become a pixel in the resulting image. In embodiments, for optimal results the light sensor may be switched between the first and the second mode depending on the zoom level and the lighting conditions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 shows a table indicating whether to use the first mode or the second mode depending on lighting conditions and zoom level.

DETAILED DESCRIPTION

Presented here is a system and method to record images having varying zoom levels using a lens having a substantially fixed zoom level. The resulting image can have varying zoom levels and can be of high quality. The light sensor recording the image can have a resolution higher than the desired resolution of the resulting image, for example four or eight times higher than the desired resolution of the resulting image. The high resolution of the light sensor allows digital zooming, i.e., cropping of the image, without degradation of image quality.

The light sensor can operate in two modes, where each mode produces varying resolutions of the resulting image. In the first mode, the resulting image can have a smaller resolution than the light sensor, because measurements made by neighboring sub-sensors can be combined into a single pixel in the resulting image. In the second mode, the resulting image can have the same resolution as the light sensor, because each measurement made by a sub-sensor of the light sensor can become a pixel in the resulting image. In embodiments, for optimal results the light sensor may be switched between the first and the second mode depending on the zoom level and the lighting conditions.

Varying the Zoom Level of an Image

Figure 1:
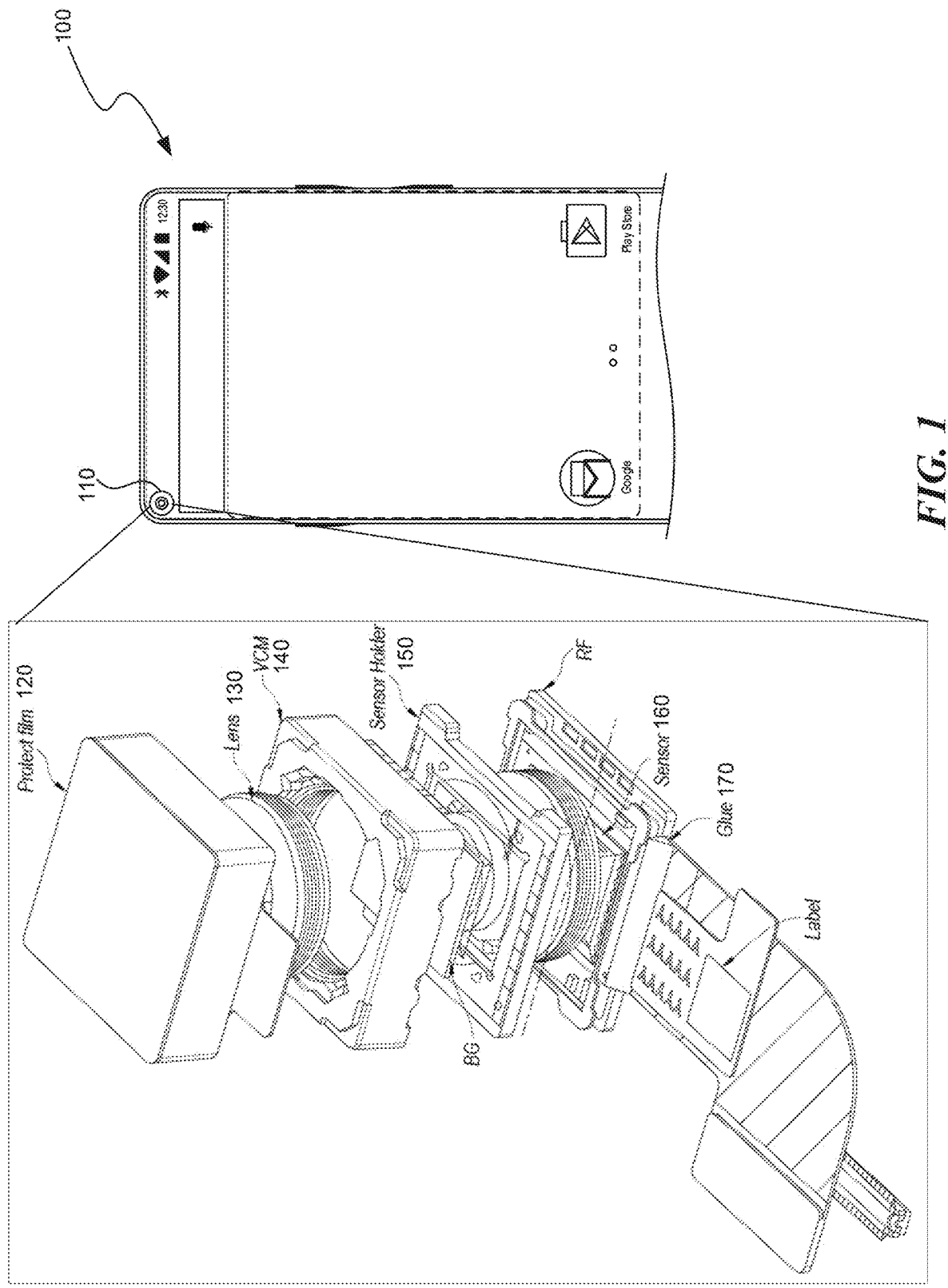
FIG. 1 shows a mobile device with a lens.

FIG. 1 shows a mobile device with a lens. The mobile device 100, such as a cell phone, can contain a camera 110, which can be a front facing or a back facing camera. The camera 110 can contain multiple layers such as a protective film layer 120, a lens 130, a voice-coil motor (VCM) 140, the sensor holder 150, sensor 160, glue 170, etc.

The lens 130 can be an ultra-wide angle lens or a wide angle lens and can have a field of view of up to 100°. The lens 130 can have a predetermined focal length, i.e., a substantially fixed focal length, and a substantially fixed zoom level. In other words, the lens 130 may not be able to zoom in and out to change the field of view, or the lens 130 can have a very small zoom range such as between 1 and 1.2 zoom level.

The sensor 160 can be a dual-mode light sensor including multiple sub-sensors. The sensor 160 can be a charge coupled device (CCD) sensor, a CMOS sensor, or any type of image sensor. The sub-sensors can include any type of a photosensor such as p-doped metal-oxide-semiconductors (MOS) capacitors. The sensor 160 can operate in at least two modes, as explained below.

Figure 2B:
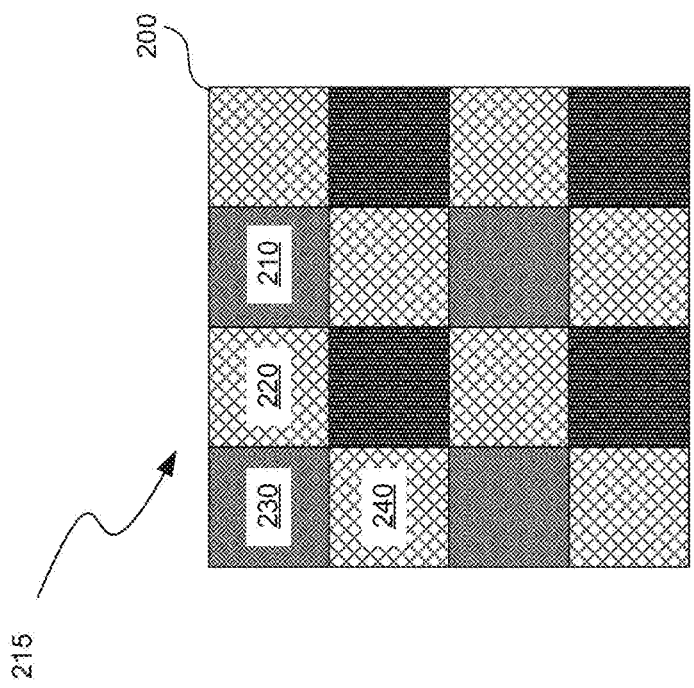
FIGS. 2A-2B show the two modes associated with the dual-mode light sensor.
Figure 2A:
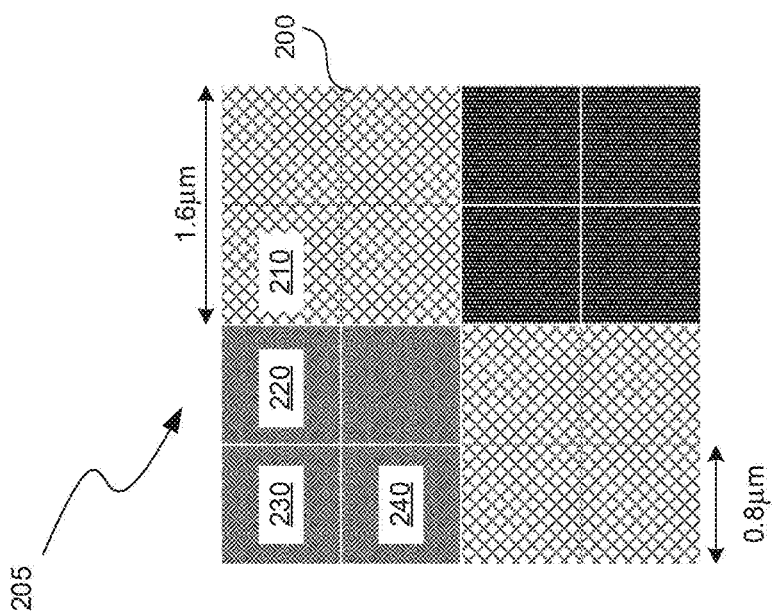

FIGS. 2A-2B show the two modes associated with the dual-mode light sensor. The dual-mode light sensor 200 can be the sensor 160 in FIG. 1. Dual-mode light sensor 200 can be a Bayer filter sensor such as a quad Bayer sensor. More specifically, the dual-mode light sensor can be a Quad Bayer Array sensor. The resolution of the dual-mode light sensor 200 can be 48 megapixel (MP) resolution. The size of the dual-mode light sensor 200 can be half-inch by half-inch. The dual-mode light sensor 200 can include multiple sub-sensors 210, 220, 230, 240, 250 (only some labeled for brevity). The size of the sub-sensor 210, 220, 230, 240, 250 can be 0.8 µm (micrometer). The different shading on the sensors shown in FIGS. 2A-2B can correspond to different colors such as red, green, blue, yellow, magenta, cyan, etc.

FIG. 2A shows the first mode 205 of the light sensor 200. The first mode 205 performs better in low light and high dynamic range situations than the second mode 215 shown in FIG. 2B. In the first mode 205, a 2×2 arrangement of neighboring sub-sensors 220, 230, 240, 250 as shown in FIG. 2A can be combined, or binned, to produce a single measurement used in the resulting image. Alternative arrangements of neighboring sub-sensors can be used, such as a 4×4 arrangement of neighboring sub-sensors, in which case all 16 sensors shown in FIG. 2A can produce a single measurement used in the resulting image. In the first mode 205, the light sensor 200 can record light focused by the lens 130 in FIG. 1 by combining, or binning, measurements obtained by at least two sub-sensors 220, 230 and producing an image based on the combined measurement.

When the 2×2 arrangement of neighboring sub-sensors 220, 230, 240, 250 as shown in FIG. 2A is used, the resolution of the resulting image is reduced by 4, for example producing a 12 megapixel image from a 48 megapixel sensor. When the 4×4 arrangement of neighboring sub-sensors is used, the resolution of the resulting image is reduced by 16, for example producing a 3 megapixel image from a 48 megapixel sensor.

FIG. 2B shows the second mode 215 of the light sensor 200. The second mode 215 provides higher resolution but worse low light and high dynamic range performance than the first mode 205 in FIG. 2A. In the second mode 215, the light sensor 200 can record light focused by the lens by producing an image based on a measurement obtained by a sub-sensor 210, 220, 230, 240, 250, without combining readings of multiple sub-sensors 210, 220, 230, 240, 250. The measurements made by the sub-sensors 210, 220, 230, 240, 250 are not combined, and a measurement made by each sub-sensor 210, 220, 230, 240, 250 can be recorded in the resulting image. The resolution of the resulting image can match the resolution of the light sensor 200. For example, a 48 megapixel sensor can produce a 48 megapixel image.

Figure 3:
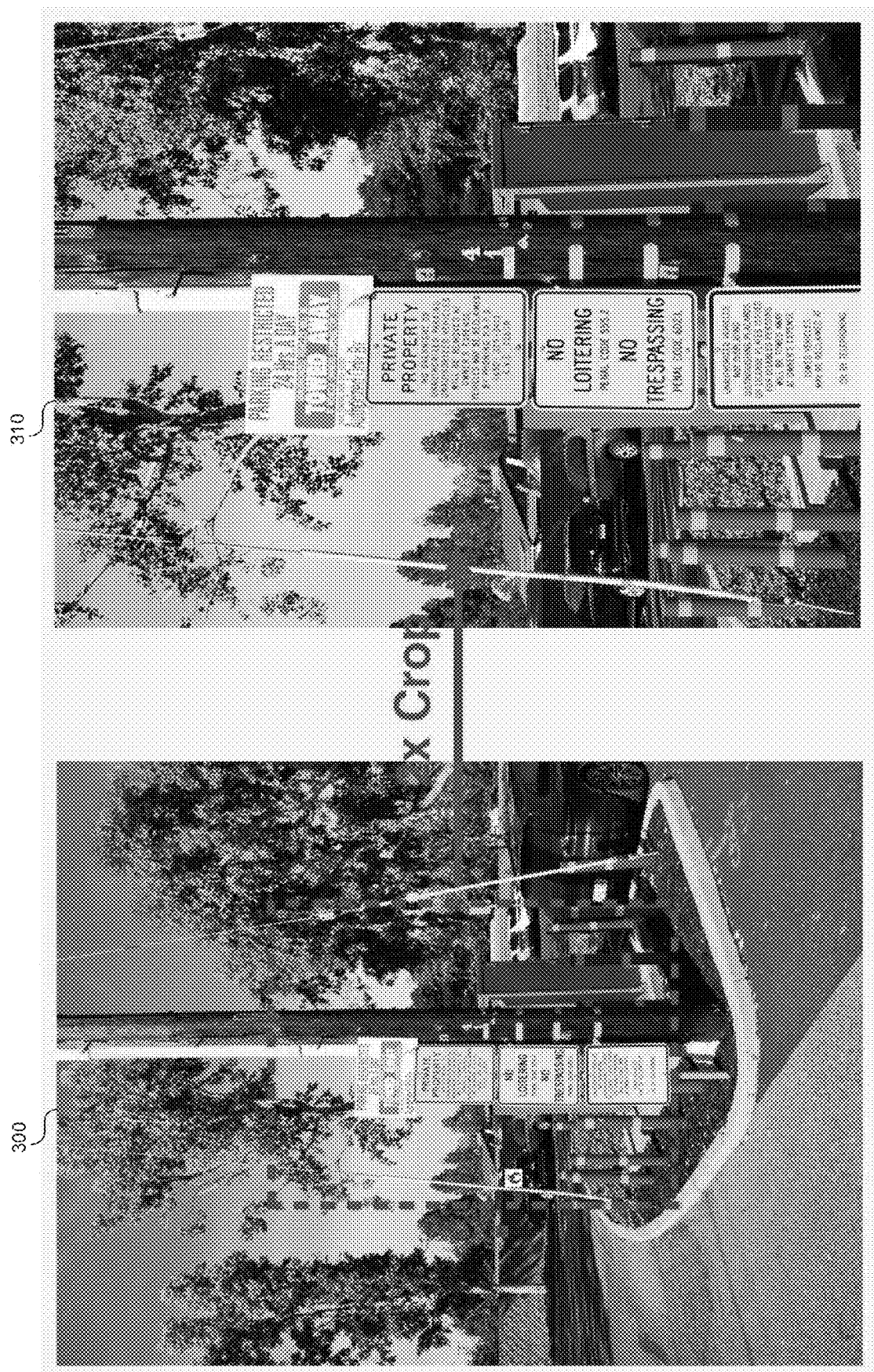
FIG. 3 shows how to achieve a factor of 2 zoom using a lens having a fixed zoom level.

FIG. 3 shows how to achieve a factor of 2 zoom using a lens having a fixed zoom level. The lens 130 in FIG. 1 can record the image 300 with a zoom level of 1, i.e., without zoom. The desired zoom level can be greater than 1, for example 2. The desired zoom level can be specified by a user wanting to take a close-up picture, such as a portrait picture, or the desired zoom level can be automatically determined based on aesthetic considerations of the image 300.

A processor associated with the lens 130 and the sensor 160 in FIG. 1, 200 in FIGS. 2A-2B can record the image 300. To obtain a zoom level of 2, the processor can crop the image 300 to obtain an image 310 with half the resolution of the image 300. If the image 300 is taken using the first mode 205 in FIG. 2A, the resulting resolution of the image 310 is a quarter of the resolution of the image 300. Such a degradation in resolution and image quality can be visible to the user.

To prevent the degradation in resolution and image quality, the processor can record the image 300 using the second mode 215 in FIG. 2B, which can produce four times higher resolution of the image 300 than the first mode 205. Consequently, to obtain the image 310 having the zoom level of 2, the processor can record the image 300 using the second mode 215, and crop the image 300 by a factor proportional to the zoom level, e.g., 2, to obtain the image 310.

Figures 4A, 4B:
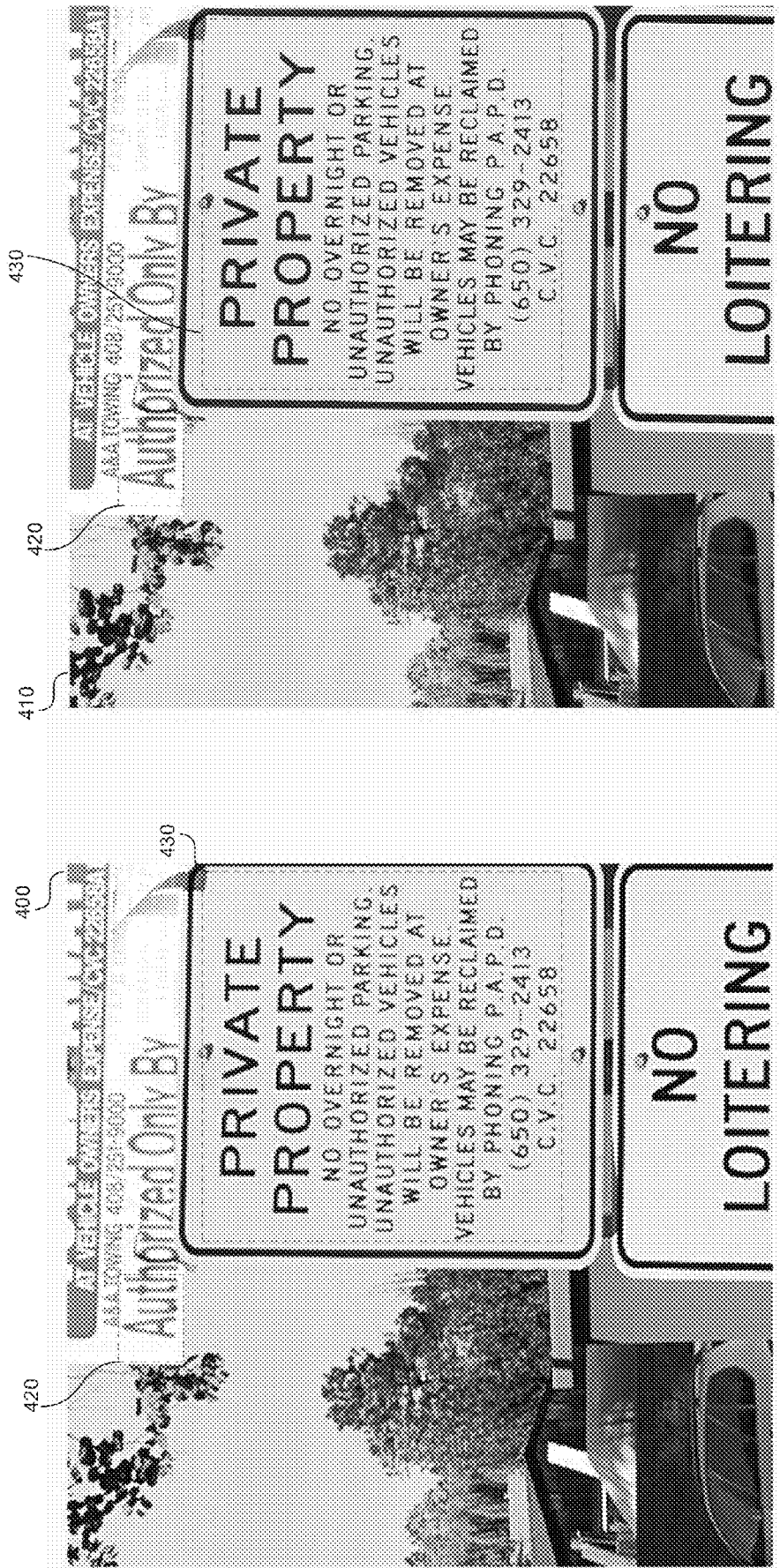
FIGS. 4A-4B show the difference between using the first mode and the second mode to obtain a zoom using a lens having a fixed zoom level.

FIGS. 4A-4B show the difference between using the first mode and the second mode to obtain a zoom using a lens having a fixed zoom level. Image 400 is obtained by operating the dual-mode light sensor 160 in FIG. 1, 200 in FIGS. 2A-2B in the first mode and cropping, while image 410 is obtained by operating the dual-mode light sensor 160 in FIG. 1, 200 in FIGS. 2A-2B in the second mode and cropping. As can be seen, at least in regions 420, 430, the quality of image 410 is higher than the quality of image 400 because, for example, the aliasing and blurriness of the letters in the regions 420, 430 is less noticeable in image 410 than in image 400.

Figures 5A, 5B:
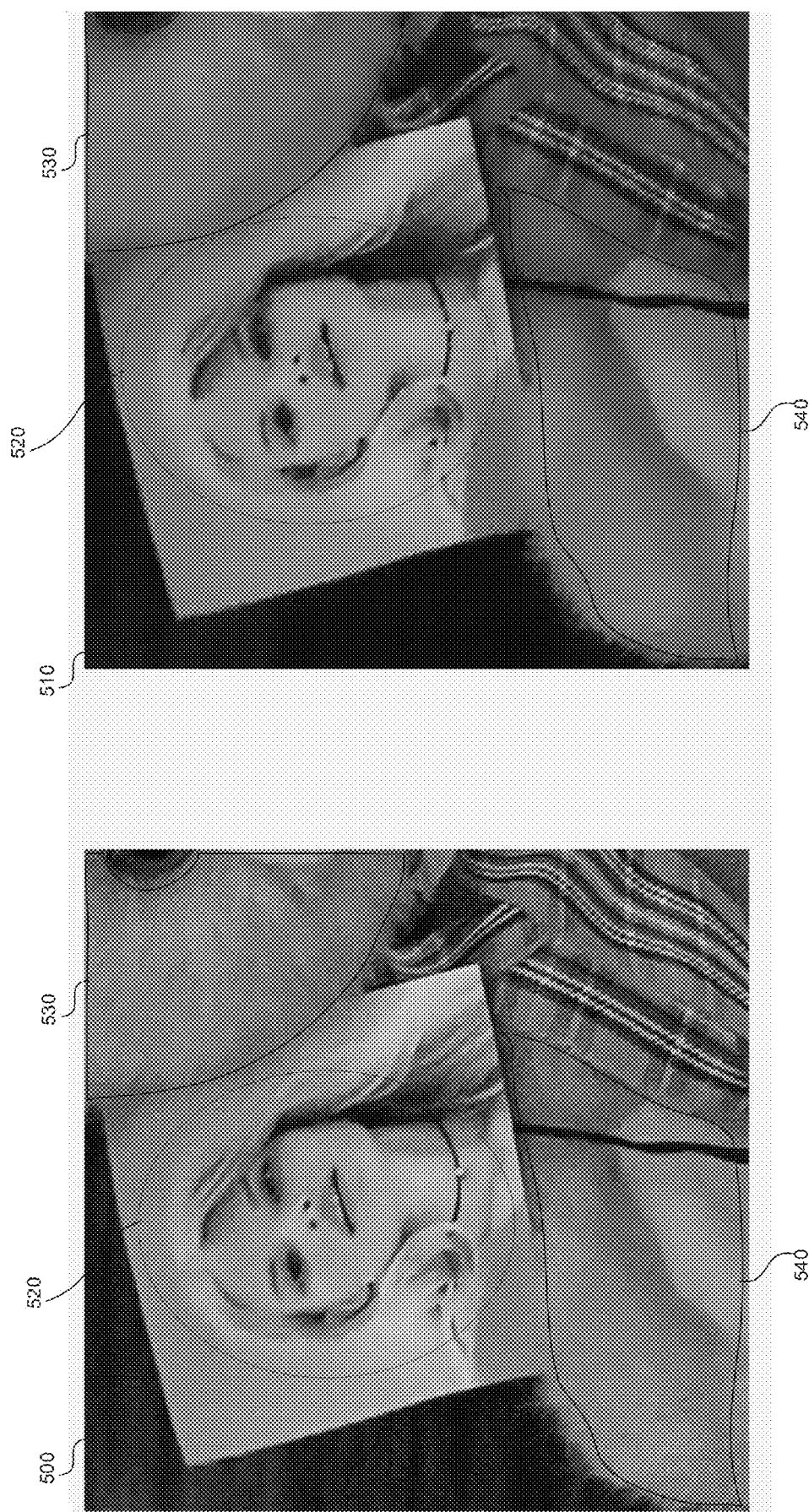
FIGS. 5A-5B show the difference between using the first mode and the second mode in low light conditions.

FIGS. 5A-5B show the difference between using the first mode and the second mode in low light conditions. The image 500 in FIG. 5A is recorded using the first mode 205 in FIG. 2A, while image 510 in FIG. 5B is recorded using the second mode 215 in FIG. 2B. Both images 500 and 510 are recorded in low light conditions. As can be seen in images 500, 510, regions 520, 530, 540 in image 500 show more detail than corresponding regions in image 510. Regions 520, 530, 540 in image 510 have higher noise-to-signal ratios in comparison to image 500, and are thus of lower quality. Consequently, in lighting conditions having low light, the first mode 205 in FIG. 2A should be used.

FIG. 6 shows a table indicating whether to use the first mode 205 in FIG. 2A or the second mode 215 in FIG. 2B depending on lighting conditions and zoom level. A processor associated with the sensor 160 in FIG. 1, 200 in FIGS. 2A-2B can obtain lighting conditions and a zoom level associated with the image and can set the dual-mode light sensor 160, 200 to the first mode 205 in FIG. 2A or the second mode in 215 FIG. 2B based on the lighting conditions or the zoom level associated with the image. The lighting conditions can be measured using a photometer or a light meter such as an ambient light sensor. The zoom level can be specified by a user, by for example specifying a type of picture such as a landscape, or a portrait. Alternatively, the processor can also determine the zoom level of the image based on aesthetic concerns of the image.

The lighting conditions can be classified into three categories, namely, bright light, mid light, and low light labeled 600, 610, 620. Bright light 600 can encompass lighting conditions over approximately 800 lux, mid light can be between approximately 1200 lux and approximately 10 lux, while low light can be less than approximately 30 lux.

The zoom level can be classified into four categories: extremely low zoom level, represented by category 630, low zoom level represented by category 640, mid zoom level represented by category 650, and high zoom level represented by category 660. When the lighting conditions indicate low light, the processor can operate the dual-mode light sensor 160 in FIG. 1, 200 in FIGS. 2A-2B in the first mode 205 in FIG. 2A. When the zoom level is greater than 1, the processor can upscale the image by a factor proportional to the zoom level, as shown in elements 670, 680, 690. When the zoom level is 1, the upscaling factor is also 1, thus resulting in no upscale.

Upscaling or resolution enhancement is the magnification of a digital image. Upscaling is creating a bigger image with higher resolution. The reason to upscale the image taken in conditions described by elements 670, 680, 690 is that an image taken using the first mode 205 may need to be cropped to provide the desired zoom level as specified in elements 640, 650, 660, and shown in FIG. 3. After cropping, the resolution of the image is reduced, and can be below a desired image resolution such as 12 megapixels. To obtain a 12 megapixel image, the cropped image may need to be upscaled to 12 megapixels.

The processor can operate the dual-mode light sensor 160, 200 in the first mode 205 when the zoom level varies between a factor of 1 and 1.4, as shown in elements 605, 615, 625. When the zoom level varies between a factor of 1 and 2 and the lighting conditions indicate more lighting than low light, the processor can operate the dual-mode light sensor in the second mode 215 in FIG. 2B and can crop the image. The cropped image may need to be upscaled or downscaled, as shown in elements 635, 645. Downscaling is opposite of upscaling and involves creating an image with a smaller resolution than the original image.

For example, the cropping shown in elements 635, 645 can be done to provide the specified zoom level. Further, the downscaling can be done to create a resulting image of a desired resolution. The desired resolution of a cell phone camera image can be 12 megapixels, while the resolution of the image taken in the second mode 215 and cropping can be larger or smaller than 12 megapixels. Consequently, the processor can upscale or downscale the image to obtain the resulting image at 12 megapixels.

When the zoom level varies between a factor of 1.4 and 2.5 and the lighting conditions indicate more lighting than low light, the processor can set the dual-mode light sensor to the second mode 215 and crop the image, as shown in elements 655, 665. The cropped image may need to be upscaled or downscaled to obtain a desired image resolution.

When the zoom level is greater than a factor of 2 and the lighting conditions indicate more lighting than low light, the processor can operate the dual-mode light sensor in the second mode 215, crop the image, and upscale the image as shown in elements 675, 685. The upscaling can be done to match the resolution of the image to a desired image resolution. For example, when the zoom level is 2, no upscaling or downscaling is needed because a 48 megapixel sensor operated in the second mode 215 produces a 48 megapixel image. After cropping the image to obtain zoom level 2, the resolution of the image becomes 12 megapixels, which can be the desired image resolution. Generally, the factor to upscale/downscale an image is proportional to the zoom level divided by 2. Upscaling occurs when the factor is greater than 1 and downscaling occurs when the factor is less than 1.

Figure 7:
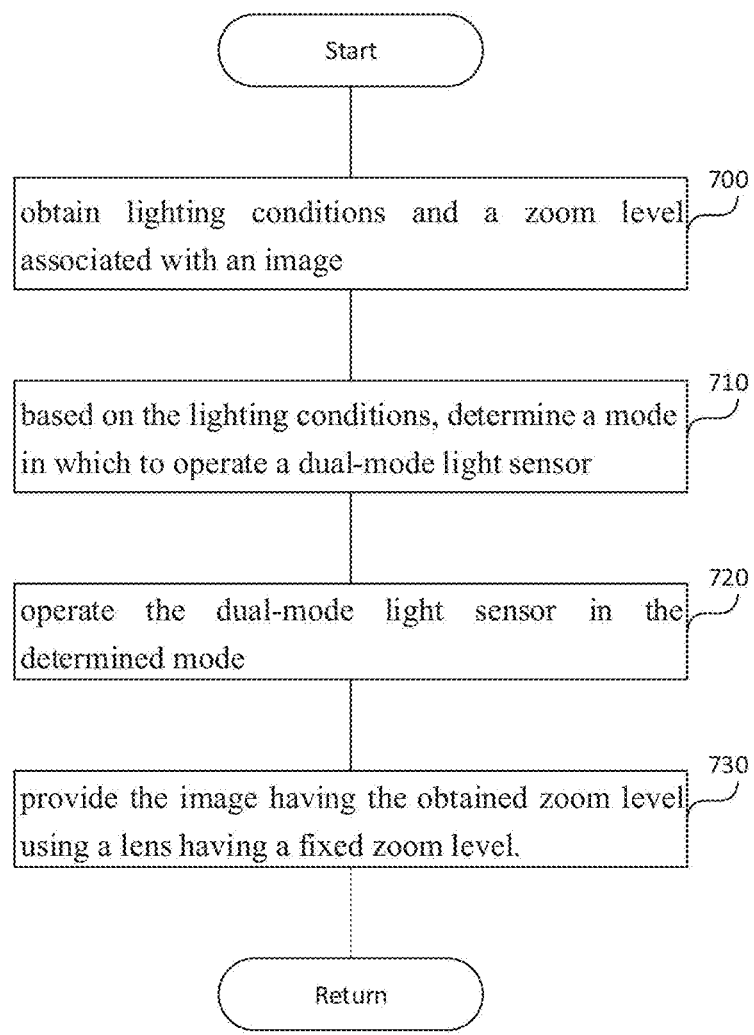
FIG. 7 is a flowchart of a method to record an image having a varying zoom level using a lens having a substantially fixed zoom level.

FIG. 7 is a flowchart of a method to record an image having a varying zoom level using a lens 130 in FIG. 1 having a substantially fixed zoom level. In step 700, a processor can obtain lighting conditions and a zoom level associated with an image. The lighting conditions can be categorized as described in FIG. 6. The zoom level can vary from an ultra-wide angle to a close up. The zoom level can be different from the fixed zoom level of the lens 130.

In step 710, based on the lighting conditions, the processor can determine a mode in which to operate a dual-mode light sensor 160 in FIG. 1, 200 in FIGS. 2A-2B including multiple sub-sensors. The dual-mode light sensor can operate in a first mode 205 in FIG. 2A to record light focused by the lens 130 by combining measurements obtained by at least two sub-sensors among the multiple sub-sensors and can produce an image based on the combined measurement. To combine the measurements, the processor can add measurements obtained by a block of neighboring sub-sensors. The block of neighboring sub-sensors can have a square shape including 2×2 sub-sensors or 4×4 sub-sensors, as shown in FIGS. 2A-2B.

The dual-mode light sensor 160, 200 can operate in a second mode 215 in FIG. 2B, where the second mode 215 is different from the first mode. The dual-mode light sensor 160, 200 operating in the second mode 215 can record light focused by the lens 130 and can produce a first image based on a measurement obtained by a sub-sensor among the multiple sub-sensors, without combining readings of multiple sub-sensors.

In step 720, the processor can operate the dual-mode light sensor 160, 200 in the determined mode. In step 730, the processor can create the image having the obtained zoom level using a lens having a substantially fixed zoom level. The substantially fixed zoom level can allow a zoom of up to approximately 1.2 zoom level. The processor can provide the image to the user.

The processor can operate the dual-mode light sensor 160, 200 in the first mode 205 when the lighting conditions indicate low light, as shown in FIG. 6. The processor can upscale the recorded image by a factor proportional, or even equal, to the zoom level to obtain the desired resolution.

The processor can define or obtain various categories, similar to the ones described in FIG. 6, defining bright light 600, mid light 610, low light 620, extremely low zoom level 630, low zoom level 640, mid zoom level 650, and high zoom level 660. The various categories can be stored in a memory accessible to the processor. Also, the processor can automatically define the categories by varying the zoom level and lighting conditions and determining the quality of the images recorded using the first mode 205 or the second mode 215 of the light sensor 160 in FIG. 1, 200 in FIGS. 2A-2B.

The bright light 600 category can be defined as greater than 800 lux, the mid light 610 can be defined as between 20 lux and 2000 lux, while the low light 620 can be defined as less than 50 lux. The extremely low zoom level 630 can vary between 80% and 150% of the substantially fixed zoom level. The low zoom level 640 can vary between 100% and 200% of the substantially fixed zoom level, the medium zoom level 650 can vary between 120% and 250% of the substantially fixed zoom level, while the high zoom level 660 can be greater than 180% of the substantially fixed zoom level. The ranges defining the categories can vary based on various factors such as a type of the sensor 160, 200, or a type of the lens 130 in FIG. 1.

The ranges defining the categories 600, 610, 620, 630, 640, 650, 660 can be stored in a memory associated with the processor, or can be automatically determined by varying the category ranges and automatically determining the quality of the images taken using the first 205 or the second 215 mode of the dual-mode light sensor 160, 200.

The processor can operate the dual-mode light sensor 160, 200 in the first mode 205 when the zoom level varies between a factor of 1 and 1.4. When the zoom level varies between a factor of 1 and 2 and the lighting conditions indicate more lighting than low light, the processor can operate the dual-mode light sensor 160, 200 in the second mode 215, can crop the image by a factor proportional to the zoom level, and can downscale the image to obtain the desired resolution.

When the zoom level varies between a factor of 1.4 and 2.5 and the lighting conditions indicate more lighting than low light, the processor can set the dual-mode light sensor 160, 200 to the second mode 215, can crop the image by a factor proportional to the zoom level and can downscale or upscaled image to obtain the desired resolution.

When the zoom level is greater than a factor of 2 and the lighting conditions indicate more lighting than low light, the processor can operate the dual-mode light sensor in the second mode 215, can crop the image by a factor proportional to the zoom level, and can upscale the image by a factor proportional to the zoom level.

Computer

Figure 8:
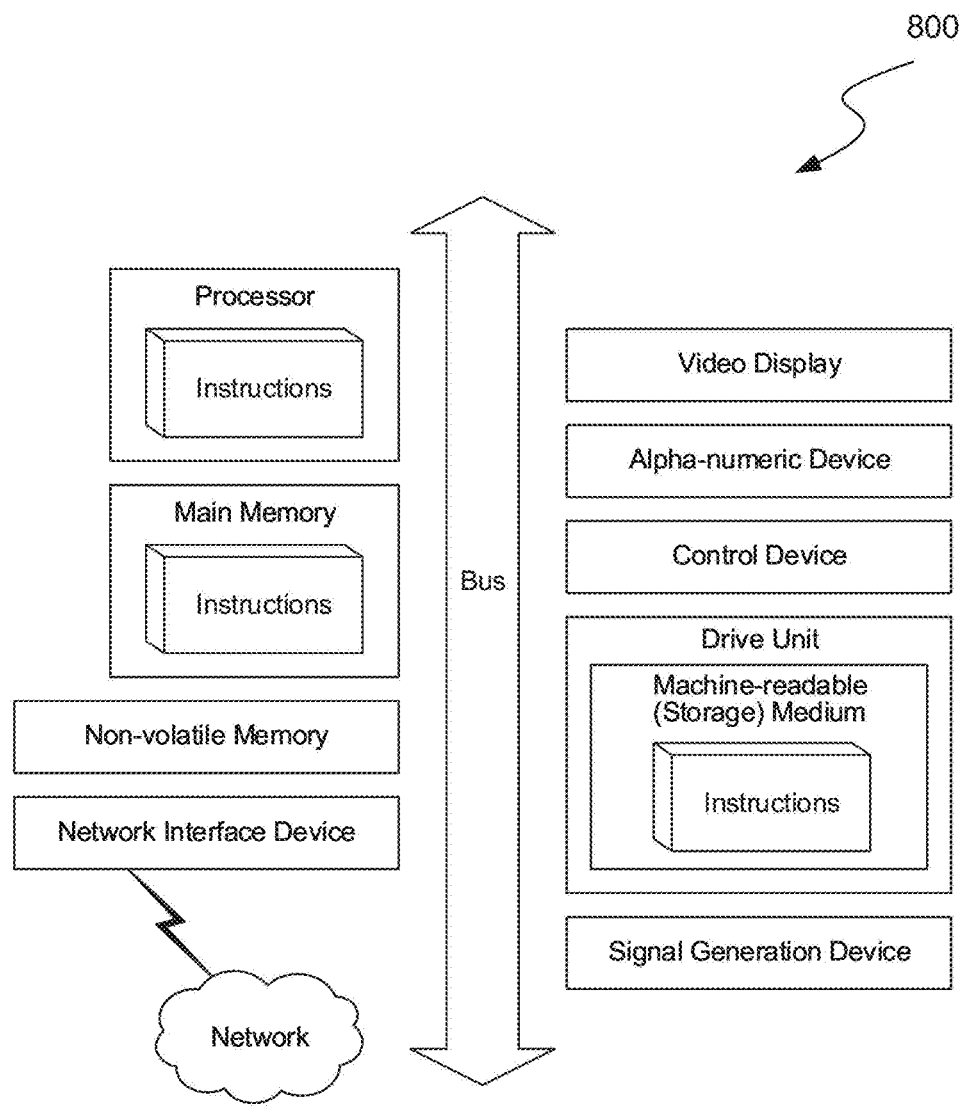
FIG. 8 is a diagrammatic representation of a machine in the example form of a computer system 800 within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

The processor of the computer system 800 can be the processor executing the various steps described in this application, such as steps associated with FIG. 7. The main memory, the nonvolatile memory and/or the drive unit with the computer system 800 can store the instructions needed to execute the various steps described in this application. The computer system 800 can be associated with the mobile phone 100 in FIG. 1.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to record an image having a varying zoom level using a lens having a fixed zoom level, the method comprising:
obtaining lighting conditions and a zoom level associated with the image wherein the obtained zoom level is different from the fixed zoom level;
based on the lighting conditions, determining a mode in which to operate a dual-mode light sensor comprising a plurality of sub-sensors and configured to operate in a first mode and record light focused by the lens by combining measurements obtained by at least two sub-sensors in the plurality of sub-sensors and producing a first image based on the combined measurement, the dual-mode light sensor configured to operate in a second mode and record light focused by the lens by producing a second image based on a measurement obtained by a sub-sensor in the plurality of sub-sensors;
operating the dual-mode light sensor in the determined mode; and
creating the image having the obtained zoom level using the lens having the fixed zoom level.

2. A method comprising:
obtaining lighting conditions and a zoom level associated with an image;
based on the lighting conditions, determining a mode in which to operate a dual-mode light sensor comprising a plurality of sub-sensors and configured to operate in a first mode to record light focused by a lens by combining measurements obtained by at least 2 sub-sensors in the plurality of sub-sensors and producing the image based on the combined measurement, and the dual-mode light sensor configured to operate in a second mode different from the first mode;
operating the dual-mode light sensor in the determined mode; and
providing the image having the obtained zoom level using the lens having a substantially fixed zoom level.

3. The method of claim 2, comprising operating the dual-mode light sensor in the second mode by recording light focused by the lens and producing the image based on a measurement obtained by a sub-sensor in the plurality of sub-sensors.

4. The method of claim 2, comprising operating the dual-mode light sensor in the first mode and upscaling the image when the lighting conditions indicate low light.

5. The method of claim 2, comprising operating the dual-mode light sensor in the first mode when the zoom level is within an extremely low zoom level.

6. The method of claim 2, comprising:
when the zoom level is within a low zoom level and the lighting conditions indicate more lighting than low light, operating the dual-mode light sensor in the second mode, cropping the image, and downscaling the image.

7. The method of claim 2, comprising:
when the zoom level is within a medium zoom level and the lighting conditions indicate more lighting than low light, setting the dual-mode light sensor to the second mode and cropping the image.

8. The method of claim 2, comprising:
when the zoom level is within a high zoom level and the lighting conditions indicate more lighting than low light, operating the dual-mode light sensor in the second mode, cropping the image, and upscaling the image.

9. The method of claim 2, said combining the measurements obtained by at least 2 sub-sensors comprising adding measurements obtained by a plurality of neighboring sub-sensors.

10. The method of claim 9, the plurality of neighboring sub-sensors having a square shape including 2×2 sub-sensors or 4×4 sub-sensors.

11. A system comprising:
a lens having a predetermined focal length and a substantially fixed zoom level;
a dual-mode light sensor comprising a plurality of sub-sensors, the dual-mode light sensor configured to operate in a first mode and record light focused by the lens by combining measurements obtained by at least two sub-sensors in the plurality of sub-sensors and producing an image based on the combined measurement, and configured to operate in a second mode different from the first mode; and
a processor configured to obtain lighting conditions and a zoom level associated with the image and to set the dual-mode light sensor to the second or the first mode based on the lighting conditions or the zoom level associated with the image.

12. The system of claim 11, comprising the dual-mode light sensor configured to operate in the second mode and record light focused by the lens by producing the image based on a measurement obtained by a sub-sensor in the plurality of sub-sensors.

13. The system of claim 11, when the lighting conditions indicate low light, the processor configured to operate the dual-mode light sensor in the first mode, and to upscale the image by a factor proportional to the zoom level.

14. The system of claim 11, when the zoom level varies within an extremely low zoom level, the processor configured to operate the dual-mode light sensor in the first mode.

15. The system of claim 11, when the zoom level varies within a low zoom level and the lighting conditions indicate more lighting than low light, the processor configured to set the dual-mode light sensor to the first mode, to crop and to downscale the image.

16. The system of claim 11, when the zoom level varies within a medium zoom level and the lighting conditions indicate more lighting than low light, the processor configured to operate the dual-mode light sensor in the second mode and to crop the image.

17. The system of claim 11, when the zoom level varies within a high zoom level and the lighting conditions indicate more lighting than low light, the processor configured to operate the dual-mode light sensor in the second mode, to crop and to upscale the image.

18. The system of claim 11, the dual-mode light sensor configured to combine the measurements obtained by at least 2 sub-sensors comprising the dual-mode light sensor configured to add the measurements obtained by a plurality of neighboring sub-sensors.

19. The system of claim 18, the plurality of neighboring sub-sensors having a square shape including 2×2 sub-sensors or 4×4 sub-sensors.

20. The system of claim 11, the lens comprising a wide angle lens.

\* \* \* \* \*